Oct. 9, 1928.

A. ISER 1,687,069

COPYING DEVICE FOR PHOTOGRAPHIC PURPOSES

Filed Nov. 26, 1923

Inventor:
A. Iser
By Marks & Clerk
Attys.

Patented Oct. 9, 1928.

1,687,069

UNITED STATES PATENT OFFICE.

ADALBERT ISER, OF REICHENBERG, CZECHOSLOVAKIA.

COPYING DEVICE FOR PHOTOGRAPHIC PURPOSES.

Application filed November 26, 1923, Serial No. 677,115, and in Germany December 7, 1922.

The invention relates to a device for copying and enlarging photographic views.

For linear alterations in sizes within a certain range, for instance from 2.5 to 5 times linear enlargement or reduction, the sensitized layer-carrier is according to this invention arranged at a permanent distance opposite to a bowl-shaped diffusely reflecting source of light. This device makes it at the same time possible that in case of a vertical arrangement the apparatus is kept low so that an attending of same can be effected at about the height of a table. In order to obtain a great strength of light and to ensure a uniform distribution over the layer-carrier, the reflector is composed of an opaque glass bowl on the circumference of which projecting lamps are fixed in known manner, and each lamp produces a cone of light that is arranged perpendicular to the longitudinal axis of the lamp. These lamps concentrate their light on the central zone of the bowl.

Figure 1:
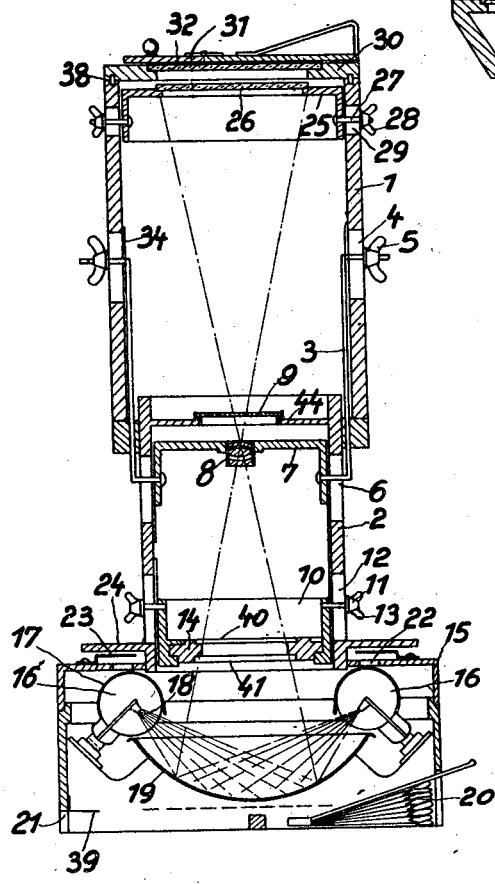
Figure 5:
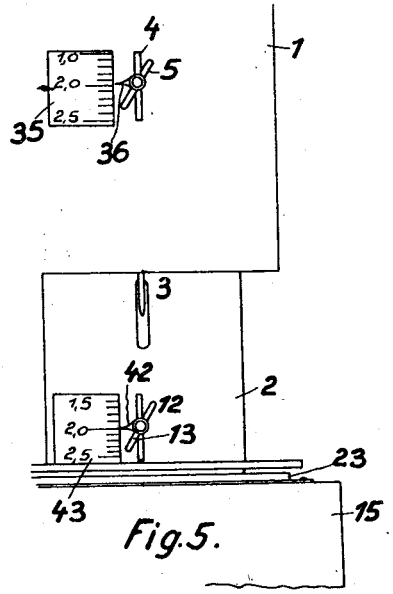
Figure 2:
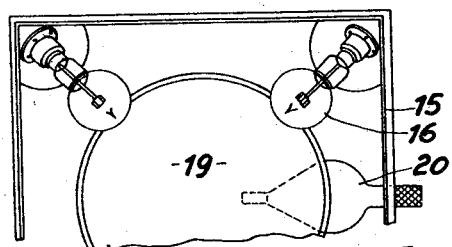
Figure 3:
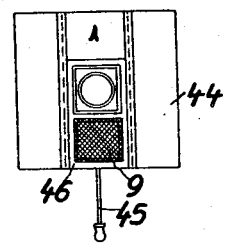
Figure 4:
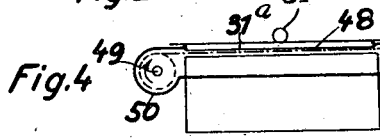

Upon the accompanying drawing one mode of carrying out the invention is shown, and it is:

Fig. 1, a longitudinal section,

Fig. 2, a partial plan of the device,

Fig. 3, the view of a changing device for the yellow or red pane,

Fig. 4, the view of a top part for roller paper,

Fig. 5, a side view of the device, and

Figure 6:
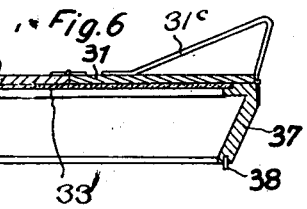

Fig. 6, a mounting for great enlargements.

The foot of the apparatus is formed by a wooden box 15, in which an opaque glass bowl 19 is fixed. The circumference of this bowl is provided with several projecting lamps 16. The light cone 18 of each lamp is arranged at a right angle to the longitudinal axis of the lamp, and the lamps are blinded at their backs 17.

The lamps throw their light upon a central zone of the bowl 19. Outside of this zone of the reflector an additional diffused light is produced which increases the brightness, underneath the negative. With the aid of a red or yellow lamp to be switched on separately the copying or enlarging of the view may be watched.

By means of blinding screens 23, 24 and 39 ventilating openings 21 and 22 in the box 15 are covered in such a manner that the light cannot pass out of the box. In order to intensify the cooling effect a bellows 20 may be employed.

Upon the box 15 a removable casing 2, 1 is resting, the lower part 2 of which contains the picture 40 to be reproduced and the object-glass 8. The former is together with a glass protecting plate 41 arranged within a frame 14, which for the purpose of exchanging the negative, slides in the guides of a second frame 10. The distance of the frame 10 from the source of light can be altered within a slight range. For this purpose, bolts 11 are provided, on which nuts 13 are mounted for holding the frame 10 in any desired position. These bolts 11 are passed through slots 12 which are made light proof. The bolt 11 is fitted with a hand 42 for a scale 43.

The object-glass 8 is mounted on a frame 7 which can be adjusted with regard to the source of light by means of two rods 3 which pass through slots 4 as threaded bolts and which can be fixed in any position by means of nuts 5. Also in this case provision has been made for a hand 36 and a scale 35. The light-proof sealing of the slots 4 is effected by means of plates 34. Above the object-glass 8 a plate 44 is fixed in which is resting a slide 46 (Fig. 3) adjustable from the outside by means of a handle 45. The slide is provided with a red or yellow pane 9 which is moved in front of the object glass. The sensitized positive element 32 is according to its size supported by a mounting 30 or 37 respectively, which is detachably placed upon the casing 1 by means of pins 38. The element 32 has an unchangeable distance from the source of light and different mountings 30, 37 can be used for changes in size within a certain range, for instance, from 2.5 to 5 times linear enlargement or reduction. The mountings 30, 37 hold the sensitized element at a constant predetermined distance from the light source, while the adjustment of the corresponding enlargement is effected without altering this distance, by adjusting the negative support and the lens system. The sensitized positive element 32 is pressed upon a glass plate 33 by means of a hinged lid 31, which is forced downwardly by a spring 31$^c$. In case a roller paper 48 is used, as shown in Figure 4, rolls 49 are arranged in a light-proof casing 50 underneath a removable lid 31$^a$ having a handle 31$^b$. Underneath the frames 30 and 37, respectively, a frame 25 is fixed for holding vignettes 26 of any desired shape.

The unchangeable distance between the source of light and the layer-carrier is dimensioned in such a way that sharp copies clear in light are obtained. Therefore no adjustments for clearness are required. The scales 35 and 43 serve to make the opaque pane unnecessary when adjusting the intended changes in size. In order to make the mode of working of the device better understood an example in figures may be given. In case of a light-strong object of 16.5 cm. burning width the height of the apparatus including the mounting 30 will be equal to 100 cm. and with the mounting 37 equal to 110 cm. By using the mounting 30, 1.5 to 2 fold enlargements may be produced and by using the mounting 37 enlargements such as 2 to 2.5 fold are obtained.

By subdividing the picture to be reproduced into smaller and single pictures every shape of picture within the limits mentioned can be obtained.

Devices for copying and enlarging have become known before. In case of these apparatus however the distance between the source of light and the picture to be reproduced is kept unaltered and the object-glass and the sensitized layer carrier is adjusted according to the stages of the alterations in size and in order to make a fine adjustment. By altering the distance of the source of light from the sensitized layer-carrier the intensity of the light on the layer-carrier will change with the different stages of changes in size. This makes for every change in size the special taking of a sample picture necessary in order to ascertain the correct length of time for exposure.

I claim as my invention:

1. In a copying apparatus for photographic purposes, the combination of a fixed source of light including a reflecting bowl and projecting lamps on the circumference of the bowl so arranged as to direct their light on the central zone of the bowl in a condensed manner, a positive carrier fixed relatively to the source of light, a light-proof casing between the source of light and the positive carrier, a negative carrier and a set of lenses arranged between the source of light and the positive carrier, and a colored member for interrupting the light rays projected from the source.

2. A copying apparatus for photographic purposes including in combination a white opaque bowl having projecting lamps on its circumference arranged to project cones of light in a condensed form on the central portion of the bowl, a light-proof casing enclosing the bowl and lamps and fitted with ventilating devices, a removable positive carrier fixed relatively to the bowl and having a glass plate and a lid which can be swung towards it, a second light-proof casing arranged between the first casing and the positive carrier, three superposed frames slidably mounted in the second casing and adjustable relatively to each other and to the source of light and the positive carrier, the lowermost one of said frames being adapted to carry a negative, a set of lenses in the middle of one of said frames, a vignette in the uppermost frame, and a slide arranged within the second casing between the bowl and the positive carrier and having a yellow or red transparent sheet for interrupting the projection.

3. In a copying apparatus for photographic purposes, in combination, a stationary source of light consisting of a reflecting bowl having projecting lamps on the circumference thereof, arranged in such manner as to direct their light on the central zone of the reflecting bowl, a positive carrier fixed relatively to the source of light, a light-proof casing arranged between the source of light and the positive carrier, superposed frames slidable in said casing and adjustable relatively to each other, to the source of light and the positive carrier, the lowermost one of said frames being adapted to carry the negative, a set of lenses carried by the middle frame and a vignette carried by the uppermost frame.

In testimony whereof I have signed my name to this specification.

ADALBERT ISER.